Oct. 12, 1965    J. M. GOLDSTEIN ETAL    3,211,056
PARALLELOGRAM SLIT STRUCTURE FOR A MONOCHROMATOR
Filed Nov. 28, 1961    4 Sheets-Sheet 1
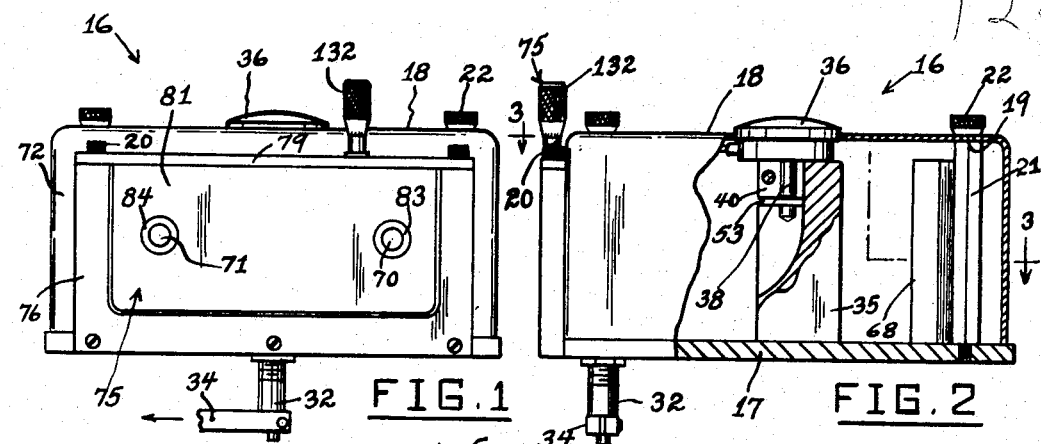
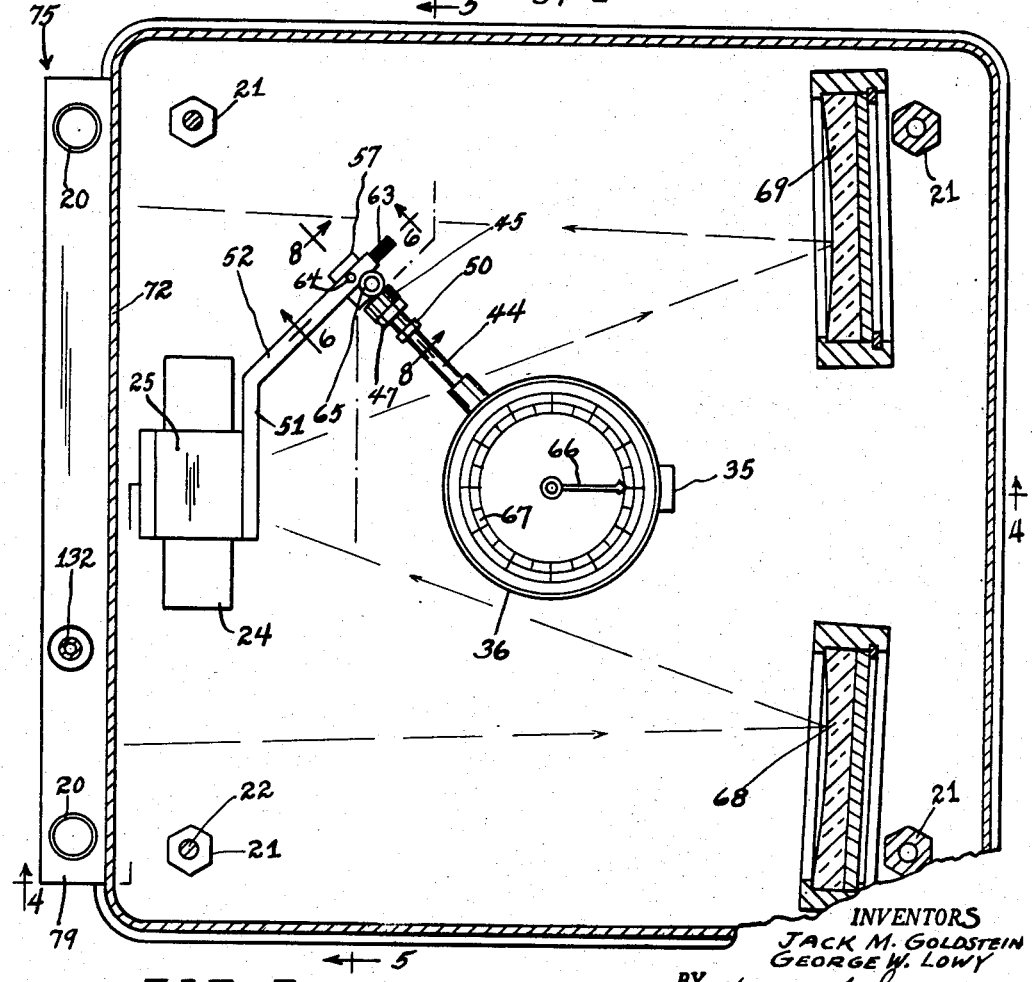
INVENTORS
JACK M. GOLDSTEIN
GEORGE W. LOWY
BY Herman L Gordon
ATTORNEY Oct. 12, 1965  J. M. GOLDSTEIN ETAL  3,211,056
PARALLELOGRAM SLIT STRUCTURE FOR A MONOCHROMATOR
Filed Nov. 28, 1961  4 Sheets-Sheet 2

INVENTORS
JACK M. GOLDSTEIN
GEORGE W. LOWY
BY Herman L. Gordon
ATTORNEY

Oct. 12, 1965    J. M. GOLDSTEIN ETAL    3,211,056
PARALLELOGRAM SLIT STRUCTURE FOR A MONOCHROMATOR
Filed Nov. 28, 1961    4 Sheets-Sheet 3

INVENTORS
JACK M. GOLDSTEIN
GEORGE W. LOWY
BY Herman R. Gordon
ATTORNEY

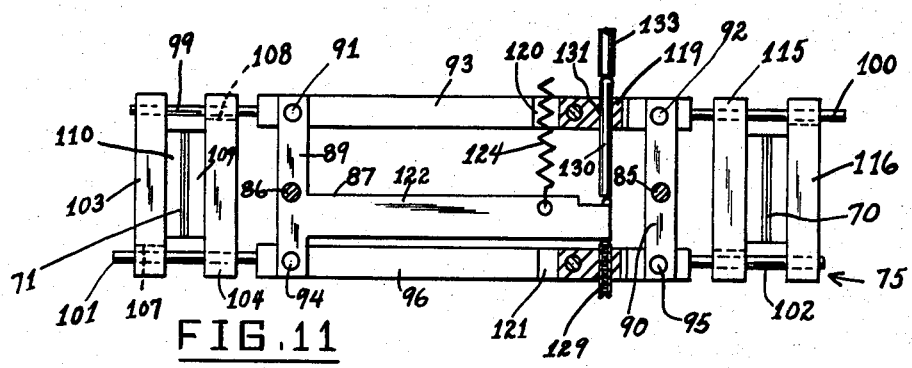
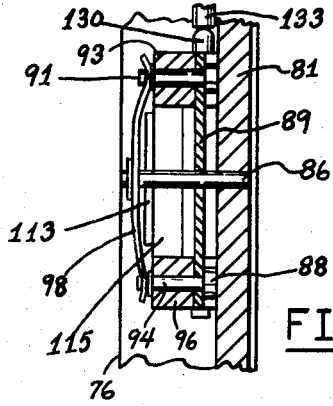
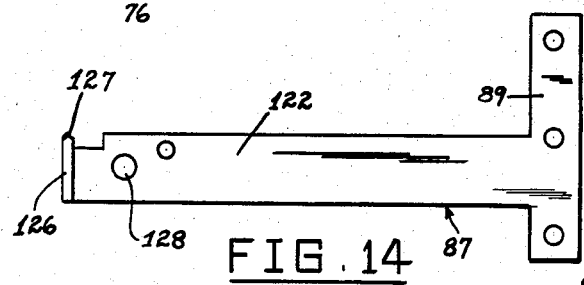
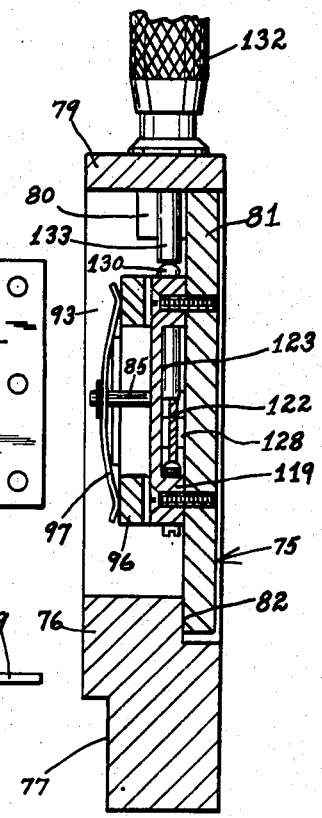

United States Patent Office 3,211,056
Patented Oct. 12, 1965

3,211,056
PARALLELOGRAM SLIT STRUCTURE FOR A
MONOCHROMATOR
Jack M. Goldstein, Silver Spring, and George W. Lowy,
Hyattsville, Md., assignors to American Instrument
Co., Inc., Silver Spring, Md.
Filed Nov. 28, 1961, Ser. No. 155,300
3 Claims. (Cl. 88—61)

This invention relates to optical instruments, and more particularly to monochromators.

A main object of the invention is to provide a novel and improved monochromator which is relatively simple in construction so that it is easy to manufacture, which is arranged so that parts thereof may be readily removed and replaced by substitute parts whenever required, and which is adaptable for a wide range of uses in laboratory work.

A further object of the invention is to provide an improved monochromator which employs a reflectance grating as its means for separating spectral components and which is provided with direct-reading means to show the angular position of the grating, the grating being arranged so that it may be readily removed and replaced by another grating whenever required.

A further object of the invention is to provide an improved monochromator having an adjustable entrance and exit slit assembly wherein the entrance slit and the exit slit are simultaneously continuously adjustable, providing a means of controlling spectral bandpass, and hence dispersion, and ultimately, resolution.

A still further object of the invention is to provide an improved monochromator having a continuously variable entrance and exit slit assembly, said assembly including means for rapidly and conveniently varying slit size, and for easily adjusting the slits to a desired size, whereby the monochromator is sufficiently flexible for a wide range of different applications, and wherein the entrance and exit slits are operated simultaneously to provide equal slit openings, thereby providing for optimum dispersion and maximum light intensity under given circumstances, and eliminating the necessity of continually adjusting two indepent slits to the same setting.

A still further object of the invention is to provide an improved monochromator of the type employing a reflectance grating, said monochromator being arranged to allow rapid, accurate and reliable interchangeability of its slit mechanisms and of its wavelength changing drive means, and which permits rapid interchange of gratings to extend its spectral range without recalibration of wavelength readout and which provides sufficient flexibility to accommodate a wide variety of wavelength drives and slit types.

Further objects and advantages of the invention will become apparent from the following description and claims, and from the accompanying drawings, wherein:

FIGURE 1 is a front elevational view of an improved monochromator constructed in accordance with the present invention.

FIGURE 2 is a side elevational view, partly in vertical cross-section, of the monochromator of FIGURE 1.

FIGURE 3 is an enlarged horizontal cross-sectional view taken substantially on the line 3—3 of FIGURE 2.

FIGURE 11 is a vertical cross-sectional detail view taken on the line 11—11 of FIGURE 10.

FIGURE 12 is an enlarged vertical cross-sectional view taken on line 12—12 of FIGURE 9.

FIGURE 13 is an enlarged vertical cross-sectional view taken substantially on the line 13—13 of FIGURE 9.

FIGURE 14 is an enlarged elevational view of the operating link member employed in the slit-adjusting mechanism of the monochromator shown in FIGURES 1 to 13.

FIGURE 15 is a top plan view of the operating link member of FIGURE 14.

Figure 4:
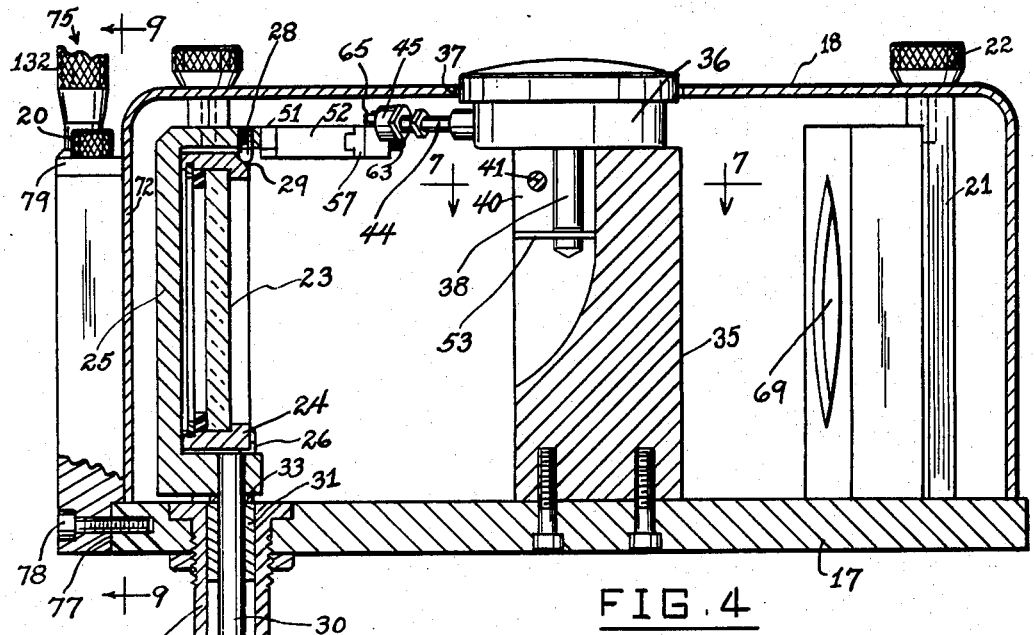
FIGURE 4 is a vertical cross-sectional view taken substantially on the line 4—4 of FIGURE 3.

Referring to the drawings, the improved monochromator is designated generally at 16. The monochromator 16 comprises a base plate 17 which may be of any suitable shape, for example, of square or rectangular shape. A removable cover 18 is provided, said cover being in the form of a housing corresponding generally in shape to base plate 17 and being formed in the corner portions of its top wall with apertures 19 receiving thumbscrews 22 threadedly engaging in the top ends of vertical supporting posts 21 secured to the corner portions of base plate 17, to clampingly secure the cover 18 on the post 21.

Figure 5:
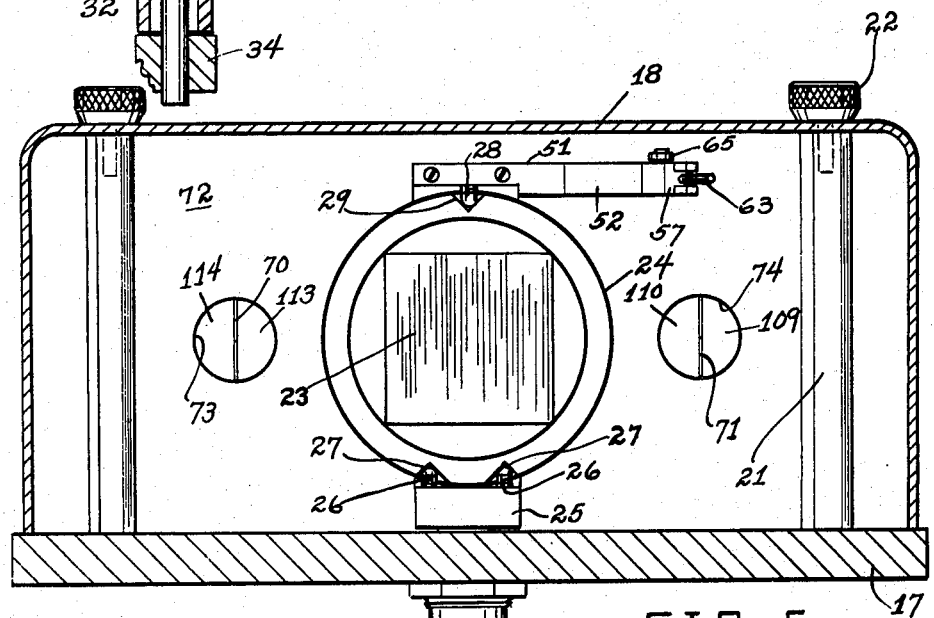
FIGURE 5 is a vertical cross-sectional view taken substantially on the line 5—5 of FIGURE 3.

A reflectance grating 23 is pivotally mounted on the base plate 17 for rotation on a vertical axis located adjacent the intermediate portion of the front margin of the base plate. Thus, as shown in FIGURES 4 and 5, the reflectance grating 23 is secured in a circular frame 24, which in turn is removably secured in a generally C-shaped bracket 25, the bottom arm of which is provided with a pair of spaced upstanding threadedly adjustable pins 26, 26 engageable in correspondingly spaced notches 27, 27 in the bottom portion of the rim of frame 24, and the top arm of which is provided with a threaded locking screw 28 engageable in a notch 29 in the top portion of the rim of frame 24. As shown in FIGURES 4 and 5, the fastening elements 26, 26 and 28 engage in the rim notches 27, 27 and 29 to clamp the ring-like frame 24 against the vertical arm of the bracket 25, the surfaces of the notches being inclined so that clamping force is developed by the fastening elements 26, 26 and 28 when the top fastening element 28 is screwed in, the pins 26, 26 being adjustable to provide proper orientation of the grating. A depending vertical shaft 30 is secured to the bottom arm of bracket 25 with its axis aligned with the vertical axis of the face of the reflectance grating 23. Shaft 30 is journalled in a bearing sleeve 31 secured in a sleeve-like bushing 32 extending through and clamped to the base plate 17. A bearing washer 33 is provided on the shaft 30 between the bottom arm of bracket 25 and the top end of the bearing sleeve 31. A horizontal operating arm 34 is secured to the lower end of shaft 30. Arm 34 may be connected to any suitable drive means for oscillating same.

Figure 7:
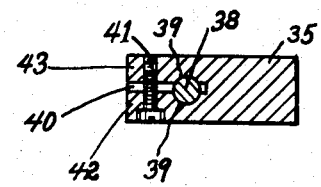
FIGURE 7 is a horizontal cross-sectional view taken on the line 7—7 of FIGURE 4.

Secured to the central portion of base plate 17 is an upstanding support block 35, on the top end of which is mounted an indicator 36 of the dial type, the face portion of the indicator extending through a central aperture 37 formed in the top wall of housing 18. The dial indicator 36 is provided with a depending supporting shank 38 which is received in opposing vertical grooves 39, 39 formed in the inside walls of a vertical slot 40 in the forward portion of block 35, and the shank 38 is clamped by means of a transverse clamping screw 41 (FIGURE 7) extending through the portions of the segments of the block forwardly adjacent the shank, the headed portion of screw 41 extending through one segment 42 and being threadedly engaged in the other segment 43, as shown in FIGURE 7. Block 35 is horizontally slotted below shank 38, as shown at 53 to allow the clamping portions of segments 42 and 43 to flex.

Figure 8:
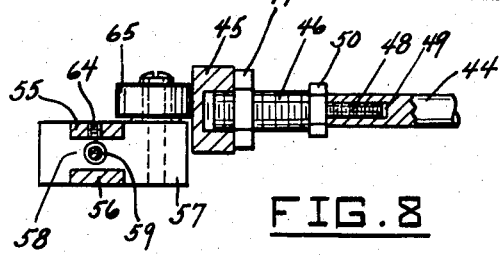
FIGURE 8 is an enlarged vertical cross-sectional view taken substantially on the line 8—8 of FIGURE 3.

Indicator 36 is provided with a laterally extending operating plunger 44 having an abutment head 45 adjustably secured to its free end portion, as shown in FIGURE 8. The abutment head 45 is threadedly mounted on a stud member 46 and is locked thereto by a locknut 47. Stud member 46 is provided with a reduced shank portion 48 which is threadedly engaged in a tapped axial bore 49 in the free end portion of plunger 44 and is also provided with an integral hexagonal flange 50 bearing tightly against the end of plunger 44.

Figure 6:
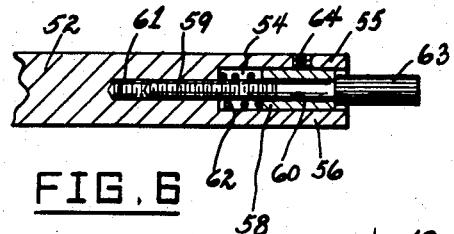
FIGURE 6 is an enlarged vertical cross-sectional view taken on line 6—6 of FIGURE 3.

Rigidly secured to the top arm of bracket 25 is a horizontal grating control bar 51 having an inclined outer arm portion 52. The end of arm portion 52 is formed with a horizontal slot 54 to define parallel upper and lower fingers 55 and 56, as shown in FIGURE 6. A rectangular block member 57 is formed with a reduced intermediate portion 58 which is slidably received in slot 54, whereby the block member 57 slidably interlocks with the arm portion 52 and is held in transversely extending relation thereto. An adjusting screw 59 extends through a horizontal bore 60 formed in the reduced intermediate portion 58 of the block and is threadedly engaged in an axial tapped bore 61 formed in the arm 52. A coiled spring 62 surrounds the screw 59 and bears between the end wall of slot 54 and the reduced block portion 58, biasing the block outwardly against the knurled head 63 of the screw, as shown in FIGURE 6. A set screw 64 is provided in the upper finger 55 which may be screwed tight against the top surface of the reduced block portion 58 to lock the block after it has been adjusted in slot 54 by means of the adjusting screw 59.

An abutment roller 65 is journalled to the top portion of the inner end of block member 57, said roller being engageable with the abutment head 45 to exert actuating force on the plunger 44, whereby the indicating pointer 66 of the indicator 36 will provide a reading on the circular scale 67 of the indicator in accordance with the angular position of the reflectance grating 23. The scale 67 may be calibrated in wavelength units so as to show the wavelength corresponding to each angular position of the grating.

A pair of mirrors 68 and 69 are mounted vertically on the rear corner portions of base plate 17, the mirror 68 being angled to reflect incoming rays from a first slit 70 onto the reflectance grating, and the mirror 69 being angled to reflect the spectral component rays from the grating to a second slit 71, or vice versa. As shown in FIGURE 5, the front wall 72 of housing 18 is formed with respective apertures 73 and 74 for transmission of the entering and exit rays.

As shown in FIGURE 3, the abutment face of the head 45 extends substantially parallel to the direction of the arm portion 52 with the grating at the zero position of its swing, so that the direction of the plunger rod 44 will be as close as possible to parallelism with the tangent of the arc of movement of roller 65.

It will be seen that by suitably adjusting the position of the abutment head 45 and the position of the abutment roller, by the means above described, the device may be calibrated so that when a beam of light enters the monochromator through the entrance slit the wavelength of a spectral component thereof reaching the exit slit via the mirror 68, the grating 23 and the mirror 69 will be accurately indicated by the pointer 66 and the wavelength scale 67. The adjustment of the roller 65 establishes the effective active radius of the grating arm 51, thus establishing the amount of actual arcuate movement of the roller per unit of angular rotation of the grating, which in turn, determines the indicated change of wavelength on scale 67 per unit of angular rotation of the grating. The adjustment of the abutment head 45 enables the pointer 66 to be set at a value on scale 67 corresponding to the wavelength of a known spectral component, which may be employed as a calibration standard. In other words, the adjustment of abutment head 45 may be employed as a zeroing adjustment for the instrument, whereas, the adjustment of the position of roller 65 on the arm position 52 may be employed as an adjustment of the calibration constant of the instrument.

As will be readily apparent, the instrument may be employed to analyze various types of light sources, of different intensities or spectral compositions, and ordinarily, an intensity-responsive light receiving device, such as a photoelectric cell, or the like, will be employed to receive the light rays emerging from the exit slit. For example, a light source of unknown spectral composition may be positioned to emit radiation through the entrance slit 70, and the driving means may be actuated to rotate arm 34, whereby to produce scanning rotation of the grating. The various spectral components of the light source will then pass through the exit slit 71 and will impinge on the detector photocell or photomultiplier, which will ordinarily be provided with suitable quantitative intensity indicating or recording means. A particular wavelength of interest may be studied by stopping the grating at a position corresponding to said wavelength, as indicated on the scale 67 of indicator 36.

In view of the wide range of intensities of light sources which may be studied, and in view of the fact that the spectral components of a particular light source may vary widely in intensity under conditions providing optimum resolution, and also in view of the fact that it is desirable to operate the photoelectric detection means within a definite range of incident light intensities, for example, within a range where the response of the detection means is substantially linear, it is desirable that the widths of the entrance and exit slits be easily and accurately controllable. For this reason, the device 16 is provided with an adjustable slit assembly, designated generally at 75, which enables both the entrance slit and the exit slit to be simultaneously adjusted in width. The main purpose of making both slits operate simultaneously to give equal slit openings is because optimum dispersion and maximum light intensity are obtained under these circumstances, and thus the need for continually adjusting two independent slits to the same setting is avoided. The slit adjustment controls spectral bandpass, hence dispersion, and ultimately resolution. In practice, it is desirable to operate at as small a slit width as possible.

The adjustable slit assembly 75 is removably secured on a generally U-shaped main supporting block 76 which is formed with a right-angled bottom recess or groove 77 which receives the front marginal portion of base plate 17 and is rigidly secured thereto by a plurality of bolts 78 engaging in the edge of base plate 17, as shown in FIGURE 4. Secured to the top ends of the vertical side arms of the block 76 by a pair of removable thumbscrews 20, 20 is a horizontal top plate 79. Secured to the underside of top plate 79 are a plurality of spaced rectangular connection blocks 80, and secured to the outside vertical surfaces of blocks 80 is a vertical supporting plate 81 whose side and bottom marginal portions are received in a marginal recess 82 formed in the front inner edge of the U-shaped block 76. As shown in FIGURE 12, the vertical plate 81 is slightly less in thickness than the depth of the recess 82 so that the front face of plate 81 is slightly inwardly offset relative to the front surface plane of block 76.

Plate 81 is formed with conical, inwardly convergent apertures 83 and 84 registering with the respective apertures 73 and 74 in the adjacent front housing wall 72.

A pair of inwardly projecting pivot shafts 85 and 86 are rigidly secured to plate 81, spaced substantially symmetrically on opposite sides of a vertical center line between the apertures 83 and 84. The head portion 89 of a generally T-shaped link bar 87 is pivotally mounted at its intermediate portion on the shaft 86. A straight link bar 90 is similarly pivoted on the shaft 85. Pivotally connected to the top ends of head portion 89 and link bar 90 by pivot pins 91 and 92 are the end portions of a top horizontal link bar 93. Pivotally connected to the bottom ends of head portion 89 and link bar 90 by pivot pins 94 and 95 are the end portions of a bottom horizontal link bar 96. Spacing washers 88 are mounted on the inner ends of the pivot pins 91, 92, 94 and 95, bearing against the inside surface of plate 81. Respective bowed leaf springs 97 and 98 are pivotally secured at their center portions on the inner end portions of the stationary pivot shafts 85 and 86, said leaf springs extending substantially parallel respectively to link bar 90 and the head portion 89 of link bar 87, the ends of the springs being apertured and pivotally receiving the ends of the pivot pins 92, 95, and 91, 94. The leaf springs 97 and 98 resiliently urge the horizontal link bars 93 and 96 against the associated link elements 90 and 89, urging the link elements against the washers 88, and holding the link elements in yieldable frictional engagement with the link bars 93 and 96.

Secured in the ends of the upper horizontal link bar 93 are the longitudinal outwardly projecting rod elements 99 and 100, and secured in the ends of the lower horizontal link bar 96 are the similar longitudinal outwardly projecting rod elements 101 and 102. Respective parallel vertical bars 103 and 104 are secured on the rods 99 and 101 at 105 and 106, the lower end of bar 103 being formed with a slot 107 slidably receiving the rod element 101 and the upper end of bar 104 being formed with a slot 108 slidably receiving the rod element 99. Respective rectangular plate members 109 and 110 are secured to the bars 103 and 104, said plate members having bevelled inner vertical knife edges 111 and 112 defining the slit 71 therebetween.

A pair of plate members 113 and 114 are similarly connected to rod elements 100 and 102 by means of vertical bars 115 and 116, said plate members 113 and 114 having bevelled inner vertical knife edges 117 and 118 defining the slit 70 therebetween.

Figure 9:
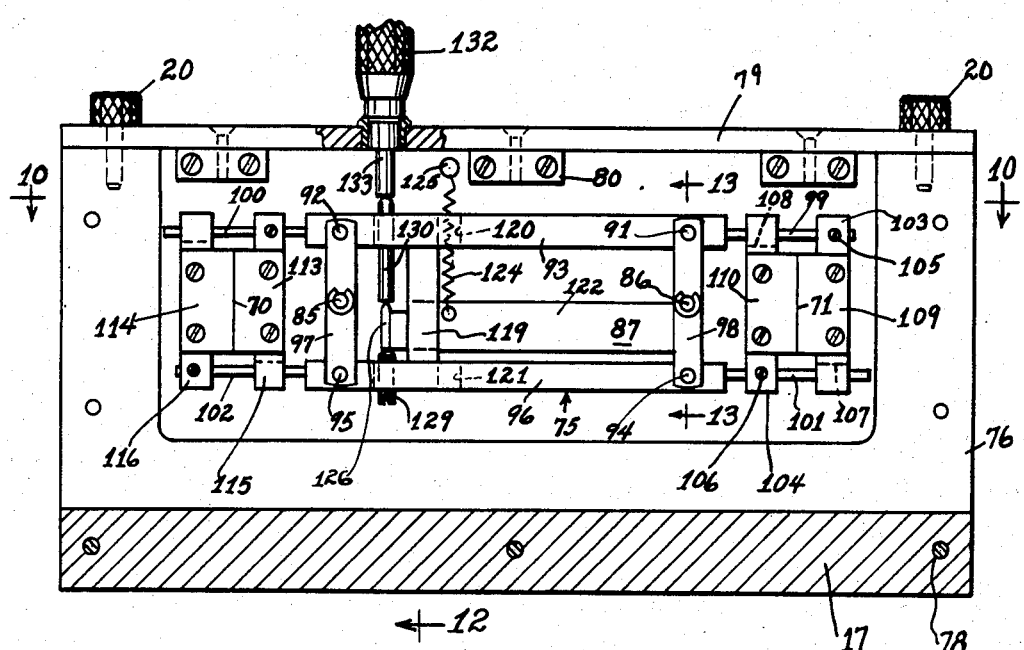
FIGURE 9 is an enlarged vertical cross-sectional view taken substantially on the line 9—9 of FIGURE 4, with parts broken away to show structural details.
Figure 10:
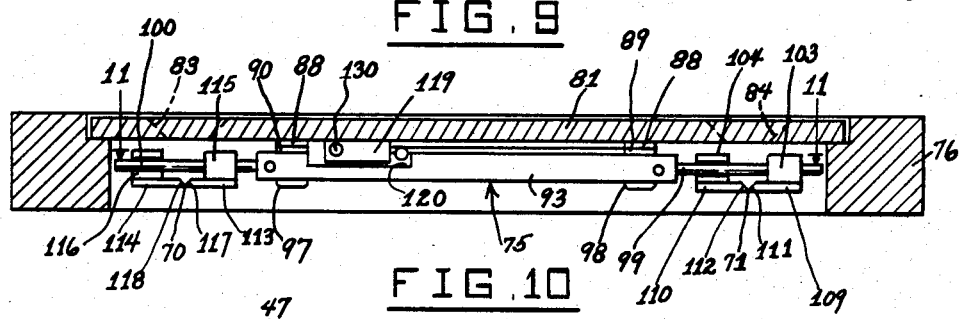
FIGURE 10 is a horizontal cross-sectional view taken substantially on the line 10—10 of FIGURE 9.

A generally C-shaped guide block 119 is secured to the inside surface of plate 81, the top link bar 93 being formed with a rectangular notch 120 and the lower link bar 96 being formed with a rectangular notch 121 to provide clearance for the upper and lower arms of block 119. The horizontally extending main stem portion 122 of member 87 extends through a wide groove 123 provided in the inside portion of block 119, as shown in FIGURE 12. A coiled spring 124 connects arm 122 to a pin element 125 secured in the upper portion of plate 81, biasing the T-shaped member 87 in a clockwise direction, as viewed in FIGURE 9.

The main stem portion 122 of member 87 is formed at its free end with a transverse flange 126 having a tapered top edge 127 substantially defining a knife edge. A transverse spacing stud 128 is secured to stem portion 122 adjacent flange 126, said stud slidably engaging between plate 81 and the vertical inside wall of the recess 123, as shown in FIGURE 12, to guide the member 122 for movement parallel to plate 81. An adjustable vertical stop screw 129 is threadedly engaged through the lower arm of block 119, being located subjacent the bottom edge of flange 126 to limit its downward movement.

A plunger rod 130 is slidably disposed in a vertical bore 131 formed in the top arm of block 119, substantially in vertical alignment with the stop screw 129, as shown in FIGURE 11. Mounted in the horizontal plate 79 directly above plunger rod 130 is a conventional micrometer head assembly 132 of the ratchet type. The assembly 132 includes a depending feeler rod 133 which is axially aligned with the plunger rod 130 and which is engageable therewith. Thus, spring 124 biases arm 122 upwardly, whereby knife edge 127 bears upwardly on plunger rod 130, holding the rounded top end of the plunger rod in contact with the bottom end of feeler rod 133. The link member 87 may thus be rotated by operating the micrometer assembly 132. This actuates the parallelogram linkage defined by the members 87, 93, 90 and 96, causing the link bars 93 and 96 to move horizontally in opposite directions, thereby similarly moving the cooperating pairs of slit-defining plates 109, 110 and 113, 114 to simultaneously vary the width of the slit 70 and the slit 71. The micrometer head 132 may be calibrated directly in terms of slit width, if so desired. Therefore, regardless of whether the micrometer head is direct-reading or is employed with a conversion factor, the slits 70 and 71 may be adjusted to any desired predetermined width value, which may be accurately reproduced at any time.

The stop screw 129 may be adjusted to define a limiting minimum slit width, for example, a substantially closed slit condition.

Various other types of slit assemblies may be substituted for the slit mechanism 75 above described. For example, individually adjustable, non-coupled slits may be employed, fixed slits may be employed, or slits which are automatically varied or programmed in width may be employed.

While a specific embodiment of an improved monochromator has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an instrument of the character described, an adjustable slit assembly comprising a support, a first pair of side-by-side relatively movable plate members having edges defining an entrance slit therebetween, a second pair of side-by-side relatively movable plate members having edges defining an exit slit therebetween, a parallelogram linkage mounted on said support and having a first pair of oppositely movable spaced parallel link portions and a second pair of spaced parallel link portions connecting said first-named link portions, means connecting one of said first-named link portions to the plate members on one side of the entrance and exit slits, means connecting the other of said first-named link portions to the plate members on the other side of said entrance and exit slits, an arm on one of the second pair of link portions extending inside the parallelogram linkage parallel to and between the first pair of link portions, said arm being provided at its free end with an upstanding transversely extending knife edge, said support being provided with a guide bore over said knife edge and extending substantially perpendicular to said arm, plunger means slidably mounted in said guide bore and being engageable with said knife edge to simultaneously vary the widths of the entrance and exit slits responsive to movement of said plunger means, and spring means biasing said knife edge into contact with the plunger means.

2. The adjustable slit assembly recited in claim 1, and an adjustable stop screw mounted in the support below said arm and substantially in alignment with said plunger means to limit the adjusted widths of said entrance and exit slits.

3. The adjustable slit assembly recited in claim 1, and wherein the parallelogram linkage is substantially coplanar with and is located substantially midway between said pairs of side-by-side plate members.

References Cited by the Examiner

UNITED STATES PATENTS

| 2,587,451 | 2/52 | Farrand | 88—14 |
| 2,835,167 | 5/58 | Pierce | 88—14 |
| 2,964,998 | 12/60 | Middlestadt | 88—61 |
| 3,011,391 | 12/61 | Fastie | 88—14 |
| 3,066,420 | 12/62 | Weber | 33—172 |
| 3,098,408 | 7/63 | Cary | 88—14 |

FOREIGN PATENTS 112,229  8/00  Germany.

OTHER REFERENCES

Thomas et al.: "A Grating Spectrophotometer for the Ultraviolet and Visible Regions," Journal of the Optical pages Society of America, volume 41, No. 12, December, 1951, pages 1002–1007 (pages 1002 and 1003 applied).

JEWELL H. PEDERSEN, *Primary Examiner.*